(12) United States Patent  
Avner et al.

(10) Patent No.: US 8,661,125 B2
(45) Date of Patent: Feb. 25, 2014

(54) SYSTEM COMPRISING PROBE RUNNER, MONITOR, AND RESPONDER WITH ASSOCIATED DATABASES FOR MULTI-LEVEL MONITORING OF A CLOUD SERVICE

(75) Inventors: Jon Avner, Bellevue, WA (US); Wilson Li, Redmond, WA (US); Nirav Jasapara, Redmond, WA (US); Oleksandr Bublichenko, Bellevue, WA (US); Sean Usher, Kirkland, WA (US); Charlie Chung, Tacoma, WA (US); Mihai Jalobeanu, Sammamish, WA (US); Prasanna Kumar Padmanabhan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 155 days.

(21) Appl. No.: 13/249,204

(22) Filed: Sep. 29, 2011

(65) Prior Publication Data

US 2013/0086203 A1 Apr. 4, 2013

(51) Int. Cl.
*G06F 15/173* (2006.01)

(52) U.S. Cl.
USPC ......................................................... 709/224

(58) Field of Classification Search
USPC ................................................ 709/220–224
See application file for complete search history.

(56) References Cited

U.S. PATENT DOCUMENTS

| | | | |
|---|---|---|---|
| 6,269,330 B1 | 7/2001 | Cidon et al. | |
| 7,032,022 B1 | 4/2006 | Shanumgam et al. | |
| 7,680,925 B2 | 3/2010 | Sathyanarayana et al. | |
| 7,835,293 B2 | 11/2010 | Cidon et al. | |
| 8,316,125 B2 * | 11/2012 | DeHaan | 709/224 |
| 2009/0077623 A1 * | 3/2009 | Baum et al. | 726/1 |
| 2010/0088150 A1 * | 4/2010 | Mazhar et al. | 705/10 |
| 2011/0145836 A1 | 6/2011 | Wheeler et al. | |
| 2011/0167469 A1 | 7/2011 | Letca et al. | |
| 2012/0204187 A1 * | 8/2012 | Breiter et al. | 718/105 |
| 2012/0296977 A1 * | 11/2012 | Ellison et al. | 709/204 |
| 2013/0086203 A1 * | 4/2013 | Avner et al. | 709/217 |

OTHER PUBLICATIONS

Avoyan, Hovhannes., "Choosing the Right Monitoring Solution", Retrieved at <<http://blog.monitis.com/index.php/category/uptime-monitoring/page/4/>>, Jul. 4, 2010, pp. 19.

"Deep Monitors: Server Monitor, Application Monitor, IT Service Monitor, and Database Monitor", Retrieved at <<http://www.uptimesoftware.com/server-monitor.php>>, Retrieved Date: Aug. 9, 2011, pp. 6.

* cited by examiner

*Primary Examiner* — Lance L Barry
(74) *Attorney, Agent, or Firm* — Louise Bowman; David Andrews; Micky Minhas (57) ABSTRACT

A multi-level monitoring system is provided for monitoring multiple performance aspects of a cloud service concurrently in order to generate a full and reliable performance analysis of the cloud service. The multi-level monitoring system may include a set of components for carrying out the performance analysis of the cloud service which may be deployed together to operate externally, internally, or concurrently with the cloud service. The component framework of the multi-level monitoring system may include a main component, a plug-in associated with the main component, a definition database, a log database, and an output database. The main components of an example multi-level monitoring framework may include a probe runner component for probing the cloud service, a monitor component for generating alerts based on probe results, and a responder component for processing the alerts and taking appropriate actions to improve the cloud service performance.

16 Claims, 6 Drawing Sheets

SYSTEM COMPRISING PROBE RUNNER, MONITOR, AND RESPONDER WITH ASSOCIATED DATABASES FOR MULTI-LEVEL MONITORING OF A CLOUD SERVICE

BACKGROUND

In a collaborative environment, a cloud service may be utilized to provide computation, software, data access, and storage services for users. It may be important to continuously monitor the performance of the cloud service, infrastructure, platform and software in order to ensure optimal and efficient performance by the cloud service for the users, and to provide solutions for fixing degraded performance issues. Typical cloud service monitoring may require a variety of different monitoring methods, such as external, internal and built-in monitoring in order to ensure the cloud service is working reliably and efficiently.

External monitoring runs outside the cloud and simulates real customer actions to judge user experience. Internal monitoring runs inside the cloud, but externally to a service, and it may also simulate user actions or it may examine diagnostics being generated by the service. Built-in monitoring is a core part of the service itself and it identifies problems when they occur.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing a multi-level monitoring system is provided for monitoring multiple performance aspects of a cloud service concurrently in order to generate a full and reliable performance analysis of the cloud service. In an example embodiment, the multi-level monitoring system may include a set of components for carrying out the performance analysis of the cloud service, which may be deployed together to operate externally, internally, or concurrently with the cloud service. The framework for the set of components of the multi-level monitoring system may include a main component, a definition database, a log database, and an output database. The main component may additionally comprise a plug-in that includes the code for executing a function of the main component. The main components of an example multi-level monitoring framework may include a probe runner component for probing the cloud service, a monitor component for generating alerts based on probe results, and a responder component for processing the alerts and taking appropriate actions to improve the cloud service performance.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a multi-level monitoring system may be provided for monitoring multiple performance aspects of a cloud service concurrently in order to generate a full and reliable performance analysis of the cloud service. The multi-level monitoring system may include a set of components for carrying out the performance analysis of the cloud service which may be deployed together to operate externally, internally, or concurrently with the cloud service. The framework of the set of components of the multi-level monitoring system may include a main component, a definition database, a log database, and an output database. The main component may additionally include a plug-in containing the code for executing the function of the main component. The main components of an example multi-level monitoring framework may include a component for executing routine tests on the system on a scheduled basis, which may be a probe runner; a component for analyzing the results of the scheduled routine tests and generating system alerts based on the results, which may be a monitor; and a component for processing the alerts and taking appropriate actions to improve the cloud service performance, which may be a responder.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for providing a multi-level monitoring system for monitoring the performance of a cloud service. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
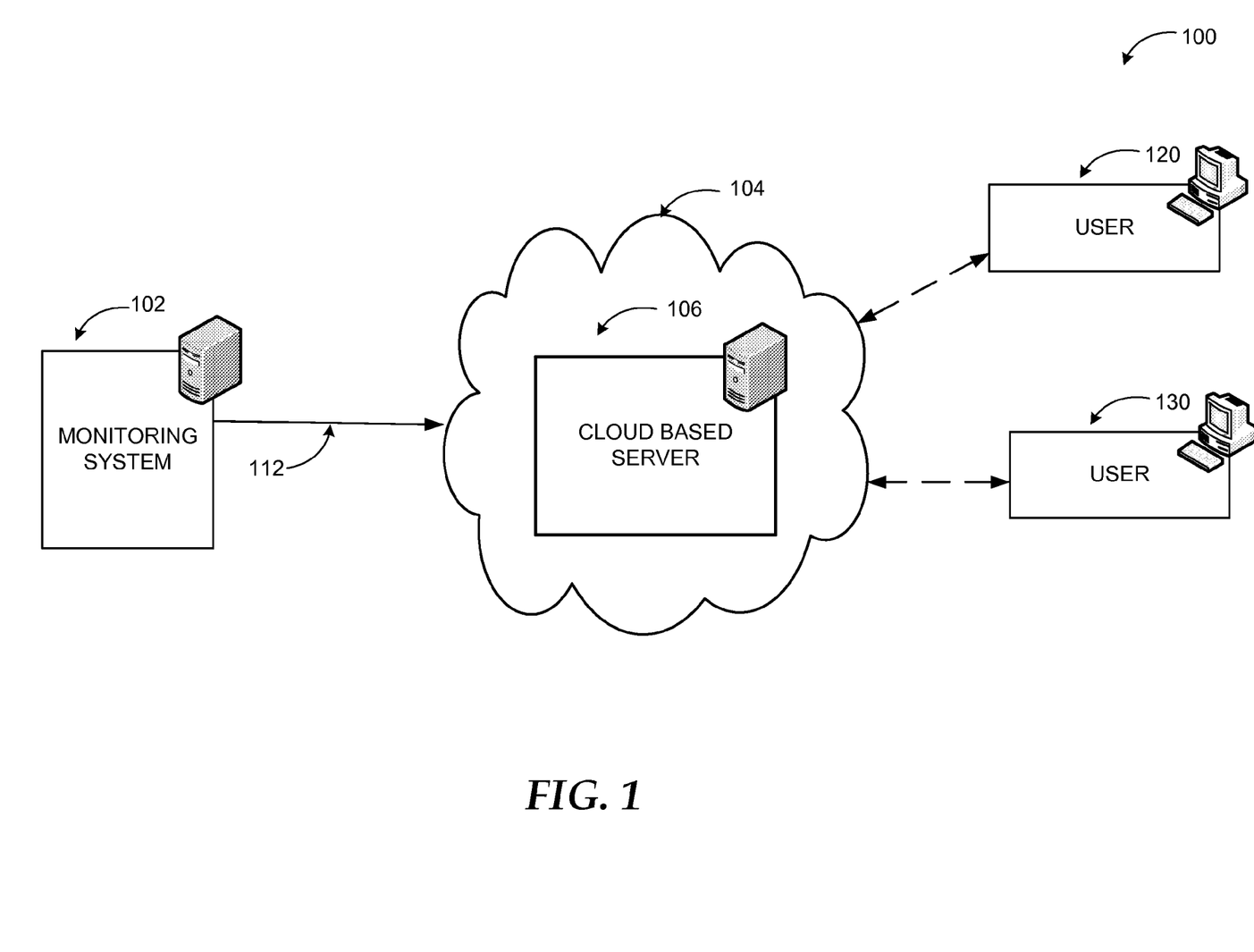
FIG. 1 illustrates an example system for monitoring a cloud service according to embodiments.

FIG. 1 illustrates an example system for monitoring a cloud service according to embodiments in diagram 100. A cloud service 104 may provide services such as computation, software, data access, and storage services to users 120, 130 who may be external to the cloud service 104, and may have access to the cloud service 104 over a network. The cloud service 104 performance may need to be continuously monitored to ensure that the cloud service 104 is performing optimally and efficiently and to identify user 120 impacting performance issues. Some aspects of cloud service performance that may be monitored may include service availability, performance and response time, error correction time, and latency.

Typical cloud service monitoring may require a variety of different monitoring methods, such as external, internal and built-in monitoring in order to ensure the cloud service 104 is working reliably and efficiently. External monitoring may involve executing synthetic transactions that simulate actions that users and customers who use the service will do, in order to ensure performance is up to customer standards. An internal system monitoring may be performed to identify issues within the cloud service 104 that may lead to customer impact, and may also help determine the root cause of service issues. Internal monitoring may involve a centralized and internal analysis of the diagnostics of the cloud service 104, such as event logs and performance counters, and may identify invalid conditions, which may or may not have immediate user impact, but may be relevant to the overall performance of the cloud service 104. Built-in monitoring may involve having the core service code within the cloud service 104 identify invalid conditions on its own, and may provide an efficient way to manage paths that need to be available and efficient within the cloud service 104 for optimum performance.

A system according to embodiments may provide a multi-level monitoring system 102 which may be configured to monitor the multiple performance aspects of the cloud service 104 concurrently. The multi-level monitoring system 102 may be configured as a single framework for monitoring the multiple performance aspects of the system, such that only one monitoring system may be employed in order to generate a full and reliable performance analysis of the cloud service 104.

In an example embodiment, the multi-level monitoring system 102 may be configured to operate as an independent system that may run external to the cloud service 104 on its own server. Additionally, the multi-level monitoring system 102 may be configured to operate internal to the cloud service 104 as an independent module on its own server. In yet another configuration, the multi-level monitoring system may be configured to run concurrently on the cloud based server 106 of the cloud service itself In a system according to embodiments, the multi-level monitoring system 102 may include a set of components for carrying out the performance analysis of the cloud service 104. The components may be deployed together to operate externally, internally, or concurrently with the cloud service 104, as described above. Additionally, the components may be deployed separately in such a way that some of the components may operate external to the system on an external server, while other components may operate internal to the system as part of the independent module, and other components may run on the cloud based server 106 of the cloud service 104 itself. Some example reliability services which may be provided by the multi-level monitoring system 102 may include providing an alert on a crashing plug-in, recovering from a crashing plug-in, handling database connectivity issues, and recovering from disk errors when writing traces to the log files.

Figure 2:
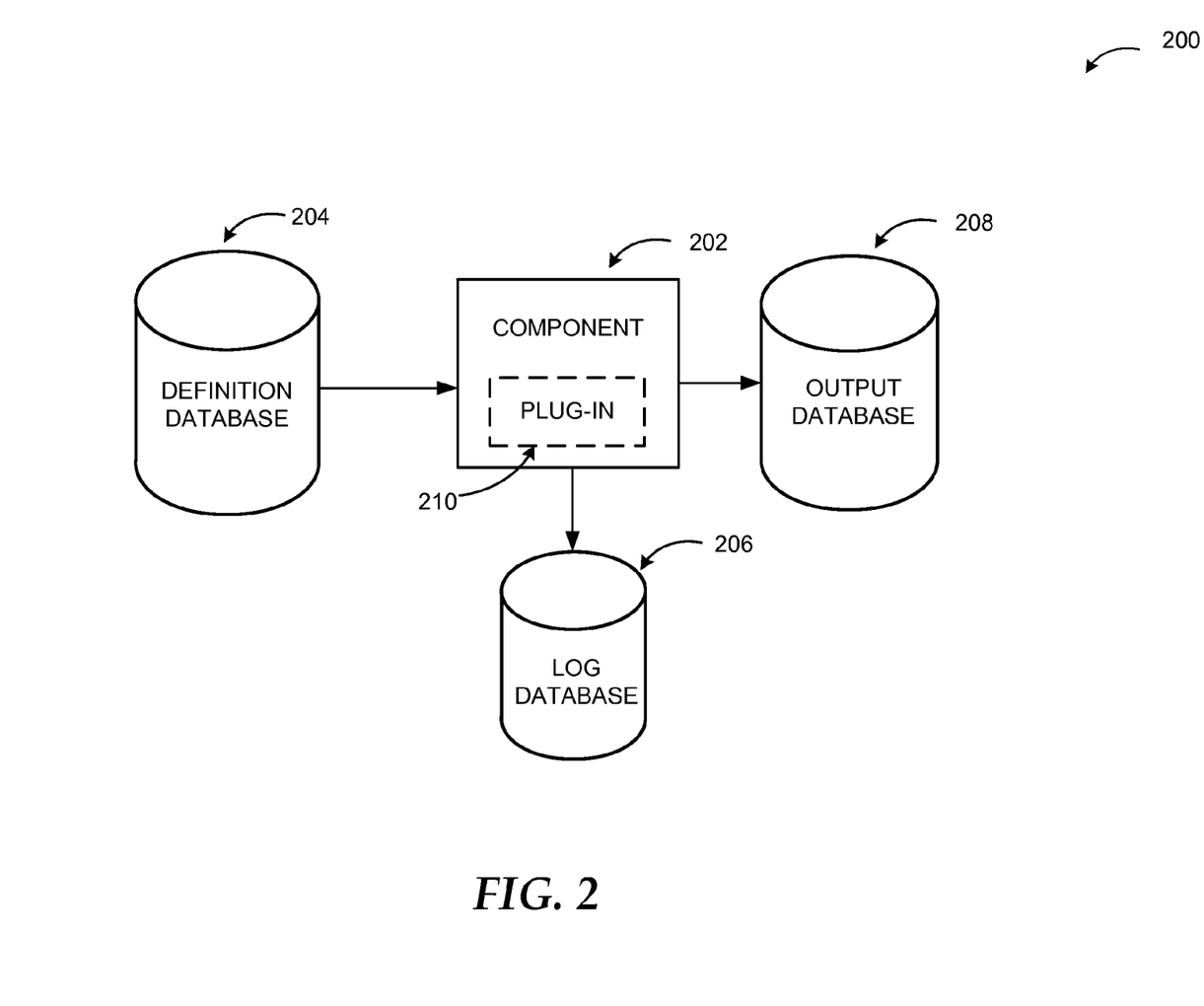
FIG. 2 illustrates an example configuration of a generic component of a multi-level monitoring system, according to embodiments.

FIG. 2 illustrates an example configuration of a generic component of a multi-level monitoring system, according to embodiments. A single framework for a multi-level monitoring system for performing external, system, and built-in monitoring of a cloud service according to embodiments, may include a set of components for carrying out the performance monitoring. The main components of an example multi-level monitoring framework may include a component for executing routine tests on the system on a scheduled basis, which may be a probe runner; a component for analyzing the results of the scheduled routine tests and generating system alerts based on the results, which may be a monitor; and a component for processing the alerts and taking appropriate actions, which may be a responder.

Diagram 200 illustrates an example framework for a component of the multi-level monitoring system. In a system according to embodiments, the component framework may include a main component 202, a definition database 204, a log database 206, and an output database 208. The main component 202 may include a plug-in 210 which may be executed by the main component 202. Each component may follow a similar functional process for performing the multi-level monitoring process of the cloud service. For example, the component may retrieve a batch of input data from the definition database 204, download and instantiate the associated plug-in 210, execute the plug-in 210, provide an output stream of the results to the output database 208 for results storage, and write log traces to the log database 206.

In an example embodiment, the definition database 204 may include definition data for providing configuration information for each component. The definition database 204 may be a relational database integrated with SQL language, a comma separate value (csv) file, and/or an extensible markup language (xml) file, for example. The definition database 204 may include a common database access layer as the interface for interacting with the SQL language, and the database access layer may contain the logic for managing the definition database 204. Each main component 202 in the multi-level monitoring system may have its own separate definition database 204. For example, a probe runner component may be associated with a probe definition database, a monitor component may be associated with a monitor definition database, and a responder component may be associated with a responder definition database. The definition database 204 may be responsible for the providing input to the main component 202 upon start-up. The input may include providing configuration data and sufficient information to the main component 202 in order for the component to configure itself and begin the monitoring process.

The plug-in 210 may include managed code which may be executed by the main component 202 in order for the main component 202 to perform its function in the monitoring process. Each main component 202 in the multi-level monitoring system may include a corresponding plug-in 210. For example, the probe runner component may be associated with a probe plug-in, the monitor component may be associated with a rule plug-in, and the responder component may be associated with a response plug-in. Each plug-in 210 may contain the managed code for instructing the component what to do and how to perform its function in the monitoring process. Each plug-in may receive configuration information from the definition database in its corresponding component framework and may communicate results of the plug-in execution back to the worker framework. The plug-in may be separate and distinct from the definition database, the output database and the log database of the component framework.

In an additional embodiment, each main component 202 may produce an output stream after completion of the component's function in the monitoring process, and the output stream may be reported to the output database 208 corresponding to the component 202. Further, after reporting of the output stream of the results of the main component 202 actions to the output database 208, the main component 202 may generate log files which may be reported to the log database 206 for future diagnostic purposes and troubleshooting.

In an example embodiment, an example scenario for each main component 202 may be as follows. Upon startup of the multi-level monitoring system the main component 202 may locate a deployment configuration file that contains sufficient information to register itself and get started, and may retrieve batch of data from the definition database 204 for initial configuration. The main component 202 may download and install the plug-in 210, and may load, configure and execute the plug-in 210. After execution of the plug-in 210, the main component 202 may write the plug-in 210 execution results to the output database 208 and may log the results of the plug-in execution to the log database 206.

Figure 3:
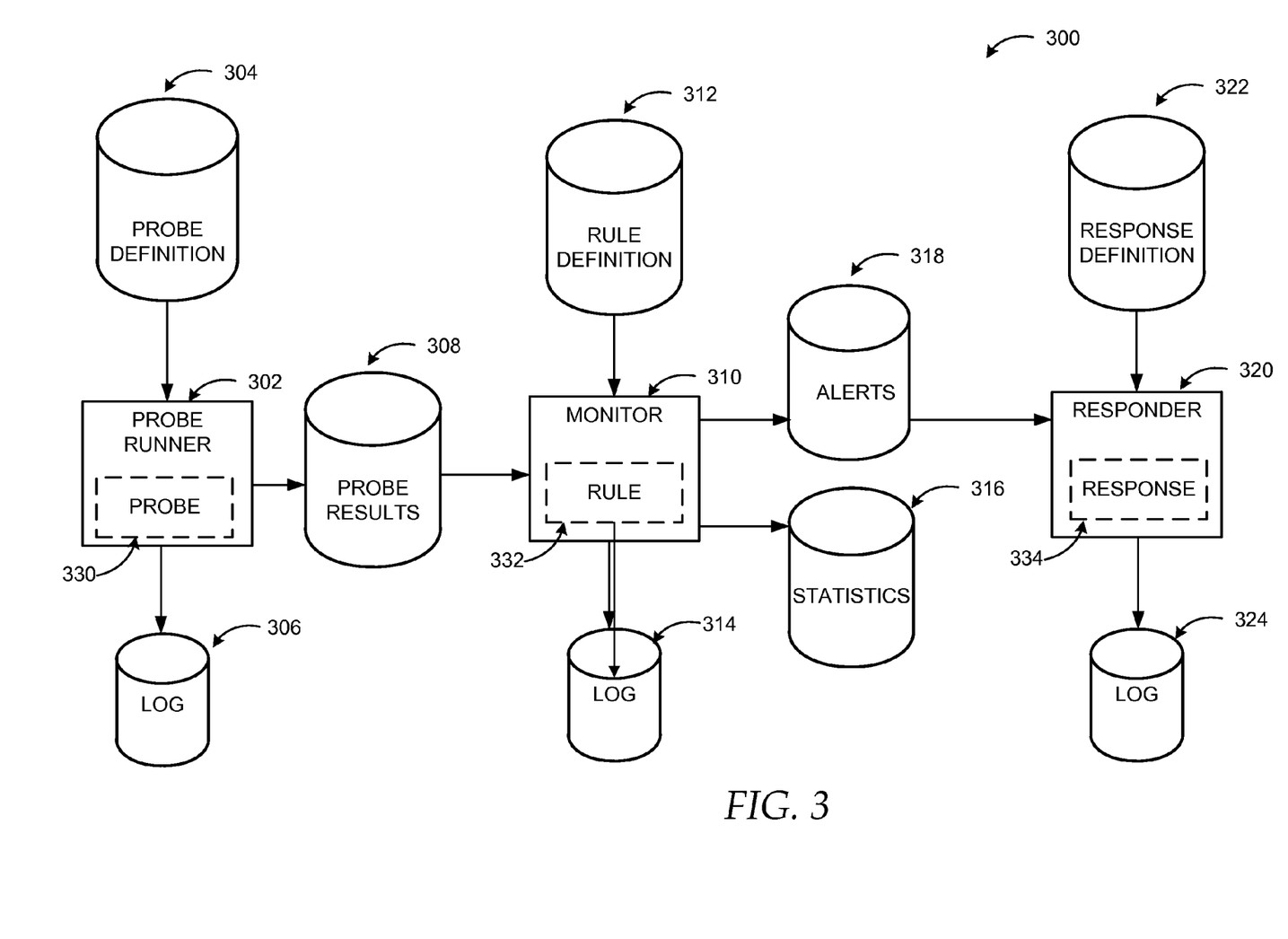
FIG. 3 illustrates an example configuration of the components of a multi-level monitoring system for a cloud service, according to embodiments.

FIG. 3 illustrates an example configuration of the components of a multi-level monitoring system for a cloud service, according to embodiments. As demonstrated in diagram 300, the infrastructure of the multi-level monitoring system may include a set of components, processes and data repositories for building the multi-level monitoring system framework. The set of components may include a probe runner 302, a monitor 310 and a responder 320.

In an example embodiment, the probe runner 302 may be configured to execute synthetic transactions against production servers in the cloud service which may simulate real user actions in order to test the performance of the cloud service. Upon initial startup of the multi-level monitoring system, the probe runner 302 may first retrieve configuration data from the probe definition database 304. The probe definition database 304 may contain the description of one or more actions that the probe runner 302 needs to run in order to execute the cloud service performance analysis, including for example, one or more entry points in the cloud service, one or more targets within the cloud service, and a probe schedule for example.

The probe runner 302 may download and install the plug-in code for a probe 330, which may be configured to simulate user activity, such as logging onto a mail web access client, for example. The probe 330 may also be configured to collect availability information from systems within the cloud service in order to evaluate the cloud service performance. The probe 330 may receive its configuration information and information it needs in order to execute the performance analysis from the probe definition associated with the probe runner 302. For example, the probe runner 302 may supply the probe 330 with the configuration information from the probe definition database 304 such as which URL to hit, and which account mailbox information to test within the cloud service. The probe runner 302 may then execute the probe 330 which may carry out the cloud service performance analysis. In order to execute the cloud service performance analysis, probe runner 302 may execute the probe 330 according to the schedule defined in the probe definition database 304. The probe 330 may be configured to collect transaction latency information for the cloud service and to collect path information, such as which servers participated in the transaction, for example. The probe 330 may communicate the performance analysis results back to the probe runner 302.

In an example embodiment, the probe runner 302 may subsequently report the results of the performance analysis by the probe 330 to the probe results database 308. The results data from the probe 330 may include success and failure for any test performed by the probe 330. A failure result may be generated for any probe 330 that does not complete, such as for example, when the probe 330 crashes or hangs. Other results from the probe 330 may include the set of resources used in the transaction, such as which servers, databases, and systems within the cloud service were tested and the latency of the testing transaction as a whole. The probe runner 302 may also report the results to the log database 306 in order to store performance testing results for later diagnoses.

In a system according to embodiments, a monitor 310 component may be configured to process the probe runner 302 results reported to the results database 308 and may be configured to generate appropriate alerts based on the results. The monitor 310 component may be configured to execute one or more rules 332, wherein a rule is a plug-in which may query the results database 308 from the probe runner 302 and may determine if an alert needs to be generated. A rule definition database 312 associated with the monitor 310 component may contain the configuration information for the rules 332, such as the entry point and targets within the cloud service. Additionally, the rule definition database 312 may include the rule schedule for the rules 332, and the monitor 310 may schedule the execution of one or more rules 332 according to the schedule defined in the rule definition database 312. In an example scenario, a rule may be configured to generate an alert if there are two consecutive failures of a probe 330 against a particular monitored database and/or system within the cloud service. The rules 332 executed by monitor 310 may range from generic rules to highly specialized rules, such that a generic rule may operate on results from any probe into a cloud service, and a more specialized rule may operate on results from a specific probe of a specific database or other system within the cloud service.

In an example embodiment, after the monitor 310 executes one or more rules 332 that result in an alert, the monitor 310 may report the alert to the alerts database 318 associated with the monitor 310. The alerts database 318 may contain a record of the current and past alerts generated by the monitor 310. Additionally, the monitor 310 may generate statistics for reporting trend analysis and other statistical information, and the monitor 310 may report the statistics to a statistics database 316 for aggregating information about the probe runner results. The monitor 310 may also report the results to a log database 314 associated with the monitor in order to store alerts history and data for later diagnoses and analysis.

In a system according to embodiments, a responder 320 component may be configured to process alerts generated by the monitor 310 from the alerts database 318, and the responder 320 may execute an appropriate response based on the alerts. A response 334 may be a plug-in that invokes the appropriate workflow in response to a particular alert. The responder 320 may retrieve the configuration information for the responses from a response definition database 322 associated with the responder 320. The configuration information may contain the appropriate response to generate as the result of a particular alert from the alerts database 318, such as what recovery action needs to be run as a result of an alert.

The responder 320 may be configured to schedule response 334 execution based on the presence of new alerts in the alert database. The response 334 may be instantiated and executed whenever a new alert is added to the alerts database 318, and may subsequently invoke the appropriate workflow. An example workflow may be an escalation, throttle, suppression, or a recovery action. Upon completion of the response 334 to a particular alert from the alerts database 318, the monitor may mark the alert as resolved and log the results in a logs database 324 associated with the responder 320.

In an example embodiment of the general process of monitoring a cloud service by the multi-level monitoring system utilizing, the process may be initiated upon startup when the system may deploy a workflow to populate the databases, including the probe definition database 304, the rule definition database 312, and the response definition database 322. The system may also deploy the components including the probe runner 302, the monitor 310, and the responder 320, and may associate each component with its respective definition database. Each component may retrieve configuration data and schedule from the respective definition database, and the components may then download and instantiate the appropriate plug-in associated with each component. Each component may then execute its associated plug-in and may write the results of the executed plug-in to its corresponding results database, until the multi-level monitoring system terminates the monitoring. For example, the probe runner 302 may execute one or more probes 330 to test systems within the cloud service and may write the results of the probes 330 to the results database 308. Upon detecting reported results in the results database 308, the monitor 310 may execute one or more rules 332 to determine if one or more alerts need to be generated, may generate the appropriate alerts to detected probe results, and may report the generated alerts to the alerts database 318. Upon detection of the presence of one or more new alerts in the alerts database 318, the responder 320 may execute an appropriate response 334 to a detected alert, and may invoke the appropriate workflow in response to a particular alert.

In a further embodiment, the probe runner of the multi-level monitoring system may run a probe against every database and/or system within in the cloud service in order to optimally test the performance of all of the processes included within the cloud service. Additionally, in order to ensure that the monitoring system is accurately validating performance of the cloud service, the multi-level monitoring system may run two or more performance monitoring tests from distinct datacenters. For example, two multi-level monitoring systems having identical copies of the probe definition database may run the performance monitoring concurrently, and each monitoring system may run execute the probes against the cloud service.

The example systems in FIG. 1 through 3 have been described with specific configurations, applications, and interactions. Embodiments are not limited to systems according to these examples. A system for providing a multi-level monitoring system for monitoring the performance of a cloud service may be implemented in configurations employing fewer or additional components and performing other tasks. Furthermore, specific protocols and/or interfaces may be implemented in a similar manner using the principles described herein.

Figure 4:
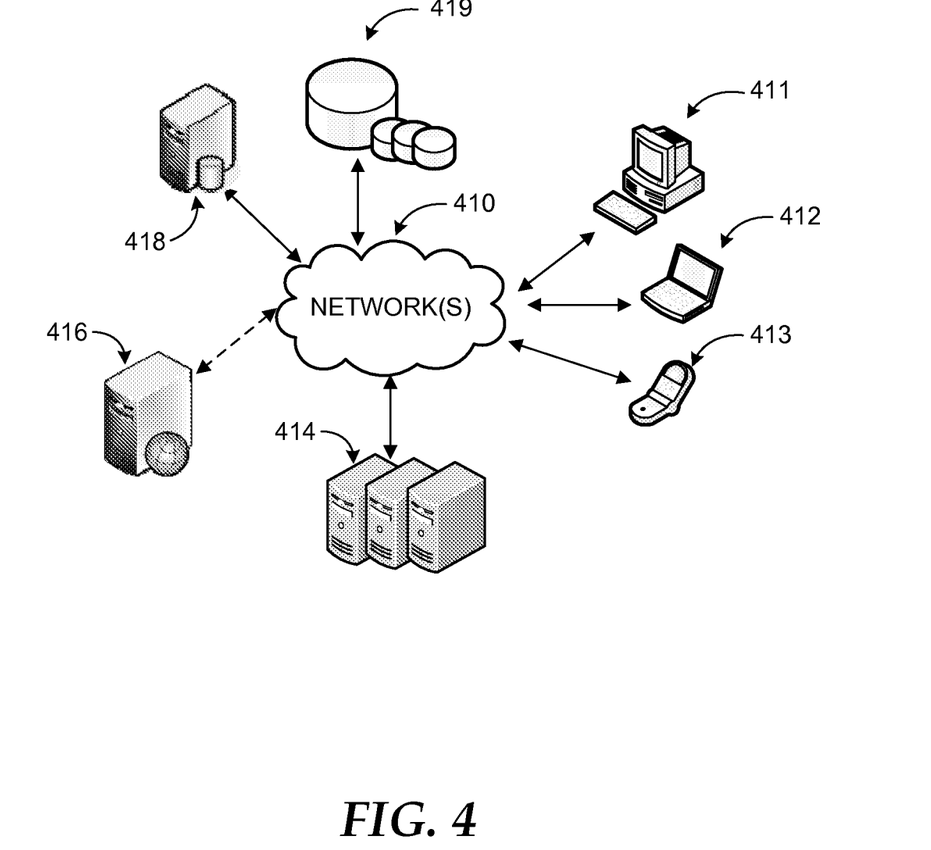
FIG. 4 is a networked environment, where a system according to embodiments may be implemented.

FIG. 4 is an example networked environment, where embodiments may be implemented. A system for providing a multi-level monitoring system for monitoring the performance of a cloud service may be implemented via software executed over one or more servers 414 such as a hosted service. The platform may communicate with client applications on individual computing devices such as a smart phone 413, a laptop computer 412, or desktop computer 411 ('client devices') through network(s) 410.

Client applications executed on any of the client devices 411-413 may facilitate communications via application(s) executed by servers 414, or on individual server 416. An application executed on one of the servers may facilitate providing a multi-level monitoring system for monitoring the performance of a cloud service. The application may retrieve relevant data from data store(s) 419 directly or through database server 418, and provide requested services (e.g. document editing) to the user(s) through client devices 411-413.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to implement a platform for providing a multi-level monitoring system for monitoring the performance of a cloud service. Furthermore, the networked environments discussed in FIG. 4 are for illustration purposes only. Embodiments are not limited to the example applications, modules, or processes.

Figure 5:
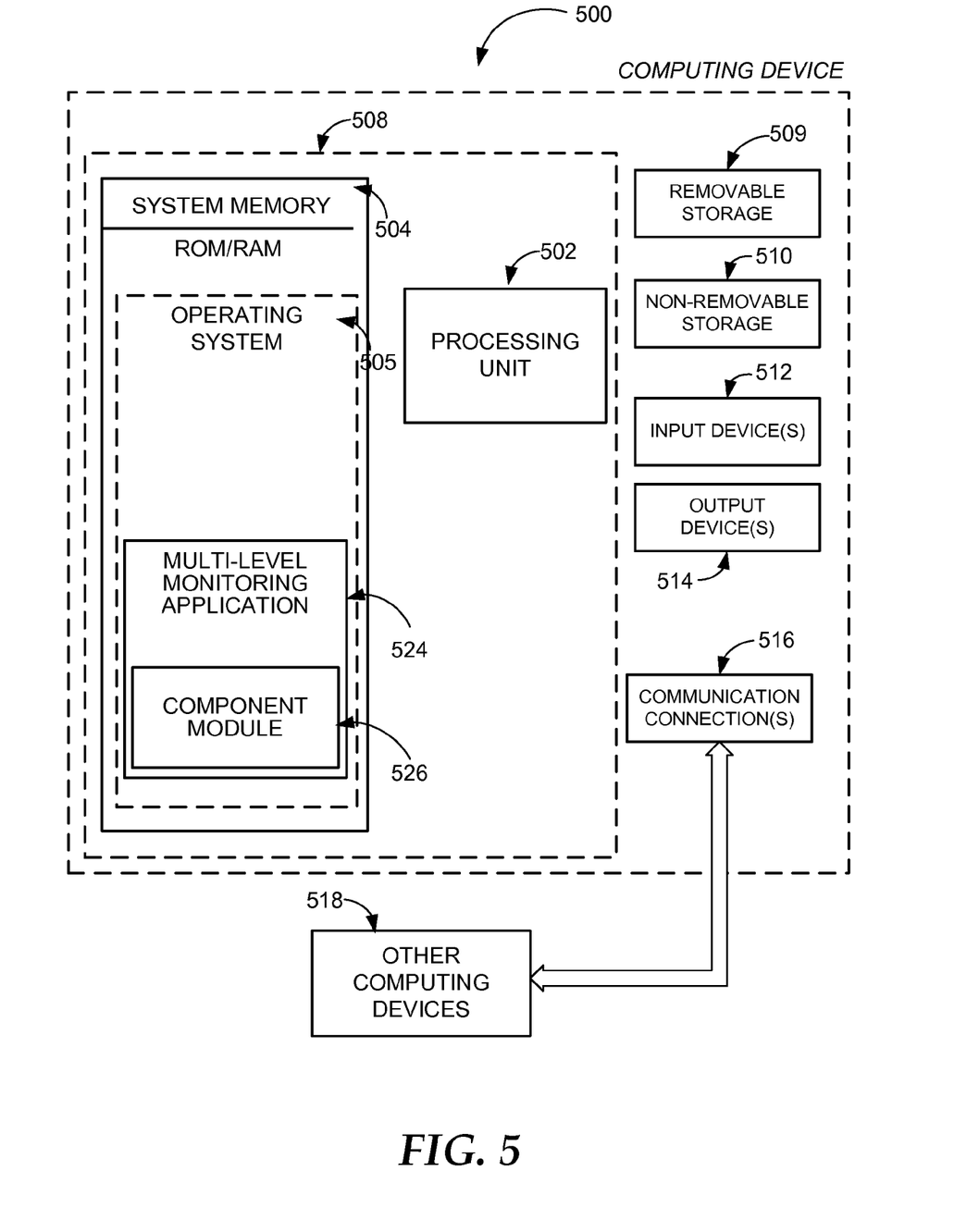
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be any computing device executing an application for providing a multi-level monitoring system for monitoring the performance of a cloud service according to embodiments and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS ® operating systems from MICROSOFT CORPORATION of Redmond, Wash. The system memory 504 may also include one or more software applications such as a multi-level monitoring application 524 and a component module 526.

The multi-level monitoring application 524 may enable the multi-level monitoring system to continuously monitor the performance of the cloud service and to generate alerts and recovery workflows for improving the cloud service performance. Through the component module 526, the multi-level monitoring application 524 may configure a set of components, including a probe runner, a monitor and a responder, to retrieve configuration information from definition databases associated with each component; to download, instantiate and execute plug-ins associated with each component; and to report results generated by each plug-in to a database associated with each component. The multi-level monitoring application 524 and the component module 526 may be separate applications or integrated modules of a hosted service. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, web servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
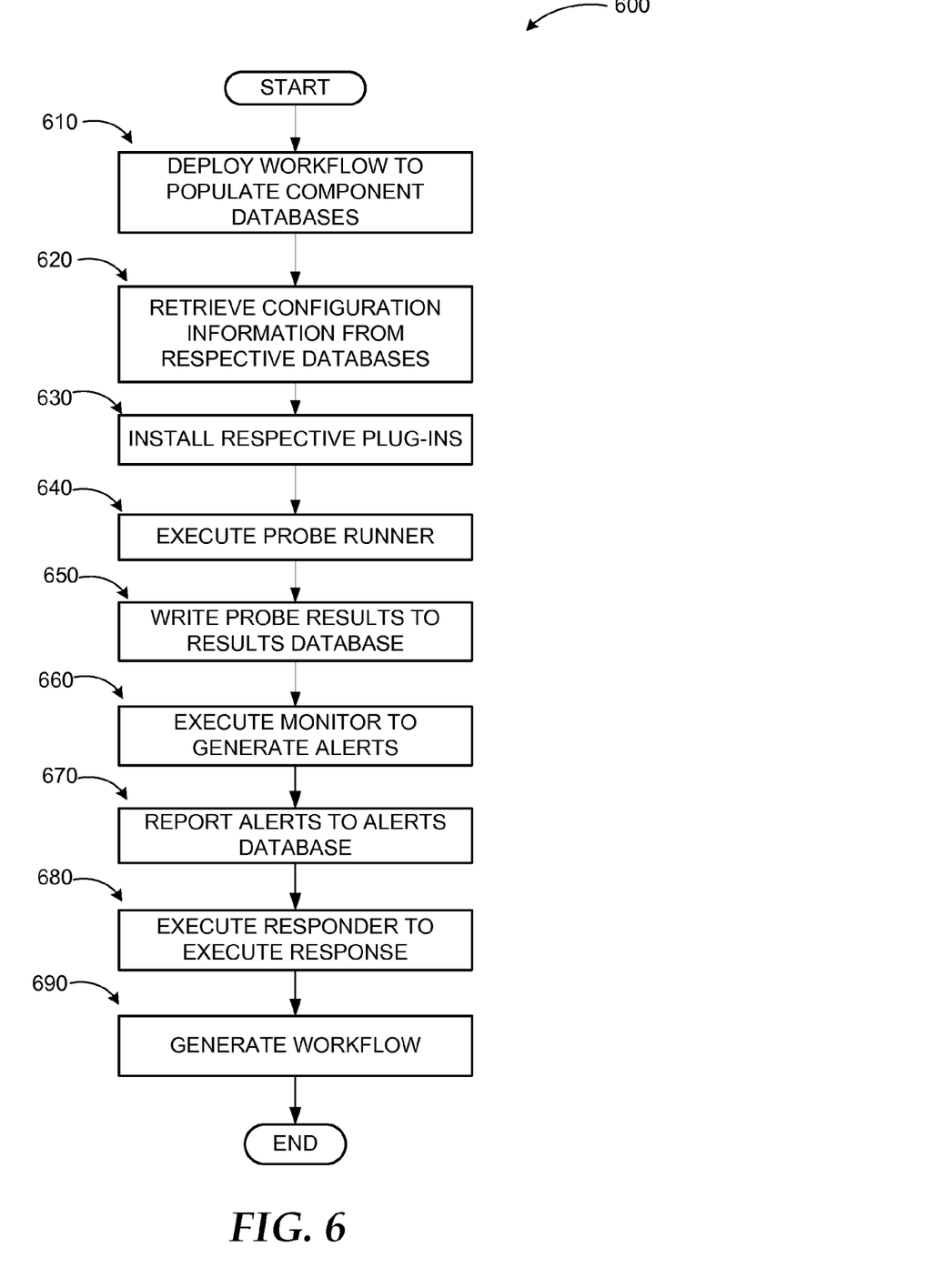
FIG. 6 illustrates a logic flow diagram for a process of multi-level monitoring a cloud service according to embodiments.

FIG. 6 illustrates a logic flow diagram for a process of multi-levelly monitoring a cloud service according to embodiments. Process 600 may be implemented on a client device communicating with a presence server or a server coupled to a client device.

Process 600 begins with operation 610, where the system may deploy a workflow to populate the databases for each of the system components, including the probe definition database, the rule definition database, and the response definition database. The system may also deploy the components including the probe runner, the monitor, and the responder, and may associate each component with its respective definition database. At operation 620, each component may retrieve configuration data and schedule from its respective definition database. This may be followed by operation 630, where each of the components may then download and instantiate the appropriate plug-in associated with each component.

At operation 640, the system may execute the probe runner component such that the probe runner may execute a probe plug-in to test systems within the cloud service. Upon completion of the probe of the cloud service, the probe runner may write the results of the probe to the results database at operation 650. Operation 650 may be followed by operation 660 where the system may execute the monitor component to generate alerts based on the probe results. The monitor may execute one or more rules to determine if an alert needs to be generated and may generate an appropriate alert for the detected probe results. At operation 670, the monitor may report the generated alerts to the alerts database. Operation 670 may be followed by operation 680 where upon detection of the presence of one or more new alerts in the alert database, the system may execute the responder component which may execute an appropriate response to a detected alert. At operation 690, the responder may invoke the appropriate workflow in response to a particular alert, such as a recovery process for the cloud service.

The operations included in process 600 are for illustration purposes. A process for providing a multi-level monitoring system for monitoring the performance of a cloud service may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method at least partially executed on a computing device for providing a multi-level monitoring system for monitoring performance of a cloud service, the method comprising:
    deploying a set of components including a probe runner component, a monitor component, and a responder component;
    associating the probe runner component with a probe definition database, the monitor component with a rule definition database, and the responder component with a response definition database;
    configuring each component from the set by retrieving input configuration data from the associated definition database, wherein the input configuration data from the probe definition database includes a description of one or more actions for the probe runner component to perform in executing a performance analysis of the cloud service and the input configuration data from the rule definition database includes a description of one or more alerts for the monitor component to generate in response to the performance analysis of the cloud service by the probe runner component;
    downloading a plug-in associated with each component;
    executing the plug-ins associated with each component; and
    providing an output stream of results of the plug-in execution to an output database associated with each component.

2. The method of claim 1, further comprising one or more of:
    associating the probe runner component with a probe plug-in;
    associating the monitor component with a rule plug-in; and
    associating the responder component with a response plug-in.

3. The method of claim 2, further comprising:
    configuring the probe runner component to retrieve the input configuration data from the probe definition database;
    enabling the probe runner component to execute the probe plug-in for executing a performance analysis of the cloud service according to the input configuration data from the probe definition database;
    enabling the probe runner component to report results of the performance analysis of the cloud service to a probe results database; and
    writing the results to a log database associated with the probe runner component.

4. The method of claim 3, further comprising:
    configuring the monitor component to retrieve the results of the performance analysis by the probe plug-in from the probe results database;
    enabling the monitor component to execute the rule plug-in to determine if an alert is to be generated based on the results of the performance analysis by the probe plug-in;
    enabling the monitor component to generate the alert based on the results of the performance analysis by the probe plug-in;
    enabling the monitor component to report the generated alert to an alerts database; and
    recording the generated alert in a log database associated with the monitor component.

5. The method of claim 4, further comprising:
    enabling the monitor component to generate statistics and report the statistics to a statistics database associated with the monitor component for aggregating information about the results of the performance analysis by the probe plug-in.

6. The method of claim 4, further comprising:
    configuring the responder component to detect when the alert is added to the alerts database; and
    enabling the responder component to execute the response plug-in to generate a response workflow based on the detected alert from the alerts database.

7. The method of claim 6, wherein the response workflow includes one or more of: an escalation, a throttle, a suppression, and a recovery action.

8. The method of claim 7, further comprising:
    upon completion of the response workflow by the response plug-in, marking the alert as resolved; and
    recording the resolved alert in a log database associated with the monitor component.

9. A computing device for providing a multi-level monitoring system for monitoring performance of a cloud service, the computing device comprising:
    a memory;
    a processor coupled to the memory, the processor executing an application for generating a performance analysis of the cloud service, wherein the application is configured to:
        deploy a set of components including a probe runner component, a monitor component, and a responder component;
        associate the probe runner component with a probe definition database, the monitor component with a rule definition database, and the responder component with a response definition database;
        configure each component of the set of components to retrieve input configuration data from respective definition databases;
        download a plug-in associated with each component of the set of components;
        execute the plug-in associated with each component of the set of components; and
        provide an output stream of plug-in execution results to an output database associated with each component of the set of components.

10. The computing device of claim 9, wherein each plug-in includes managed code to be executed by each associated component for performing component functionality.

11. The computing device of claim 9, wherein the probe definition database, the rule definition database, and the response definition database are one of: a relational database, a comma separated values (CSV) file, and an Extensible Markup Language (XML) file.

12. The computing device of claim 9, wherein the application is further configured to:
    enable the probe runner component to execute the probe plug-in for executing the performance analysis of the cloud service according to input configuration data from the probe definition database and to report results of the performance analysis of the cloud service to a probe results database;
    enable the monitor component to retrieve the results of the performance analysis from the probe results database, to generate an alert based on the results of the performance analysis, and to report the generated alert to an alerts database; and
    enable the responder component to execute the response plug-in to generate a response workflow based on a detected alert from the alerts database.

13. The computing device of claim 9, wherein the application is further configured to:
- enable the probe runner component to report a failure result of the performance analysis of the cloud service to a probe results database when one of: the probe plug-in does not complete, the probe plug-in crashes, and the probe plug-in hangs.

14. The computing device of claim 9, wherein the processor is further configured to:
- execute two or more multi-level monitoring systems for monitoring the performance of the cloud service concurrently from two or more distinct datacenters.

15. A method executed at least in part in a computing device for providing a multi-level monitoring system for monitoring a performance of a cloud service, the method comprising:
- deploying a set of components including a probe runner component, a monitor component, and a responder component;
- associating the probe runner component with a probe definition database, the monitor component with a rule definition database, and the responder component with a response definition database;
- configuring each component of the set of components to retrieve input configuration data from respective definition databases;
- downloading a probe plug-in associated with the probe runner component, a rule plug-in associated with the monitor component, and a response plug-in associated with the responder component;
- executing the plug-in associated with each component;
- providing an output stream of plug-in execution results to an output database associated with each component of the set of components; and
- recording the results of each executed plug-in to a logs database associated with each component.

16. The method of claim 15, wherein the method further comprises one of:
- operating the multi-level monitoring system as an independent system that runs external to the cloud service on a separate server;
- operating the multi-level monitoring system as an independent module on a separate server within the cloud service; and
- operating the multi-level monitoring system concurrently on a cloud-based server of the cloud service.

* * * * *